Aug. 30, 1938.  D. MURPHY  2,128,496
PACKLESS BEARING
Filed April 24, 1937  2 Sheets-Sheet 1
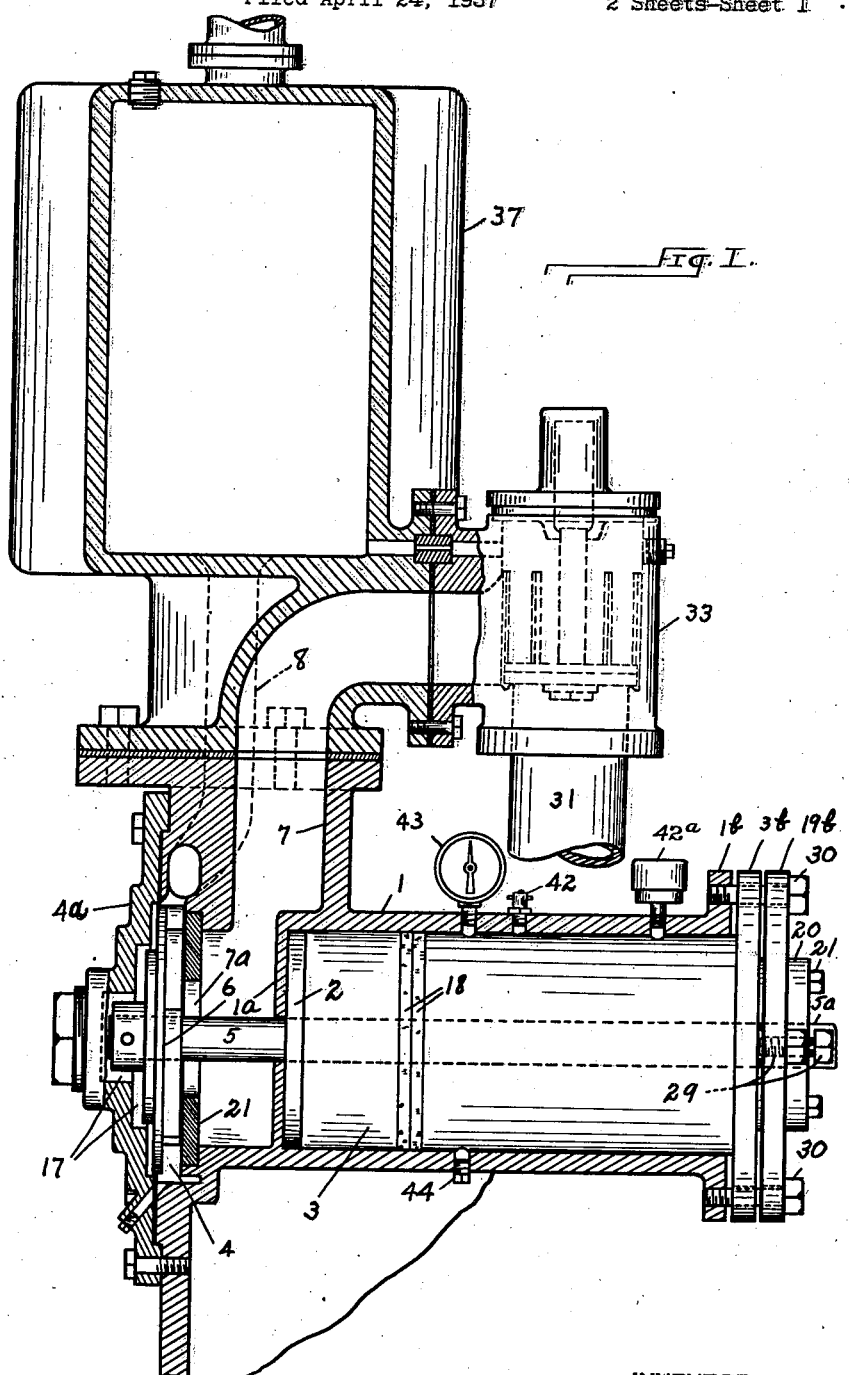
Fig. I.
INVENTOR
Daniel Murphy
BY Christy and Wharton
ATTORNEYS Aug. 30, 1938.  D. MURPHY  2,128,496
PACKLESS BEARING
Filed April 24, 1937  2 Sheets-Sheet 2
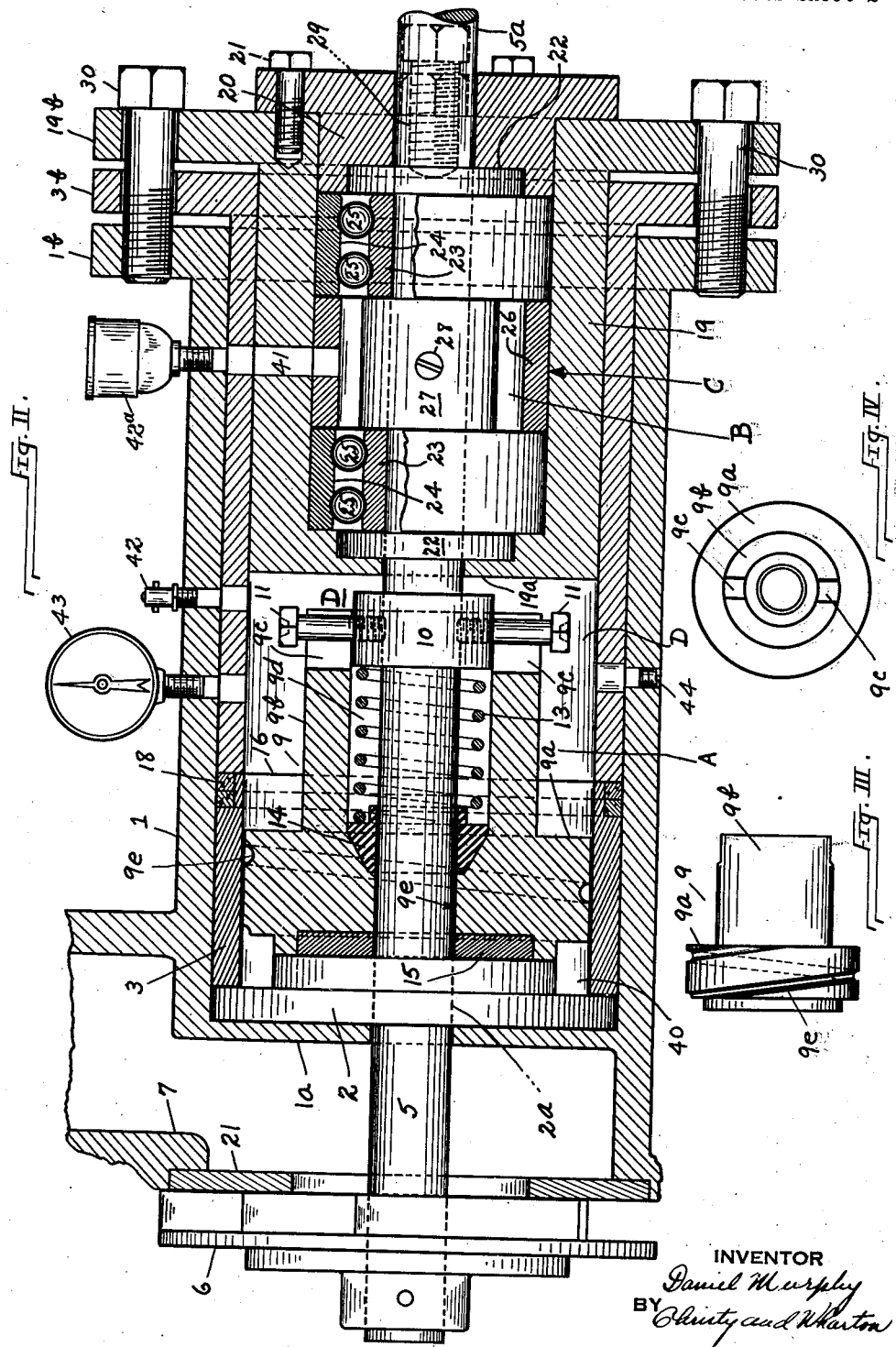
INVENTOR
Daniel Murphy
BY Christy and Wharton
ATTORNEYS Patented Aug. 30, 1938

2,128,496

UNITED STATES PATENT OFFICE 2,128,496

PACKLESS BEARING

Daniel Murphy, New Castle, Pa.

Application April 24, 1937, Serial No. 138,806

17 Claims. (Cl. 308—36.2)

My invention relates to bearings, and consists in an improved bearing particularly adapted for the impeller shafts of rotary pumps.

The object of the invention is to provide a more durable bearing for machines operating in the presence of fluids carrying particulate abrasive material, for example pumps for pumping "slip" used in the manufacture of pottery and chinaware. By virtue of my structure I advantageously avoid the use of the usual packing glands for sealing the bearing from the fluid being pumped, and I eliminate all frictional engagement between the rotating impeller shaft and stationary bearing members made of metal. In my structure substantialy all wear occurs between bearing parts that may be readily and economically replaced, and means are provided for automatically adjusting for wear in the intervals between such replacements. When the bearing is used in a pump, I utilize the suction of the pump to enhance the desired distribution of lubricant within the bearing, and I provide means for indicating both the condition of the lubricant within the bearing and any leakage from the bearing into the inlet of the pump.

While my bearing has been particularly designed for the field of service indicated, I contemplate that it will prove valuable in machinery other than pumps, and, in the following specification and claims, I do not limit the bearing structure to pumps alone.

In the accompanying drawings Fig. I is a view, partly in side elevation and partly in vertical section, of a pump in which the bearing of this invention is in exemplary way embodied; Fig. II is a fragmentary view of the pump to larger scale, showing the bearing structure partly in side elevation and partly in axial section; and Figs. III and IV are views in side elevation and end elevation, respectively, of a particular element of the bearing structure.

In Fig. I of the drawings, I show a pump of the general construction shown in my co-pending application, Serial No. 61,933, filed February 1, 1936. It consists in a pump body including the usual involute chamber 4, in which a vaned impeller 6 is mounted on a rotary shaft 5. Under the influence of the impeller in rotation, liquid is drawn (through an intake pipe 31, a check valve chamber 33, and a passage 7 and inlet 7a) into the impeller chamber, whence it is discharged by way of an outlet passage 8 into a receiver 37. When the pump is in operation, the rotating impeller produces a pressure on the liquid entering the chamber 4, and this pressure is effective upon the left-hand face of the impeller (Fig. I), tending to force the impeller against the right-hand side wall of the chamber 4. In such side wall of the chamber 4 a disc 21 of brass or other suitable material is embodied, and the disc "takes" most of the wear that normally occurs between the impeller and wall of the chamber.

As the ring 21 wears away in service, the rotating shaft 5, upon which the impeller is secured, is axially adjusted in such manner as to maintain within practical limits the desired relation between the ring and the side edges of the impeller vanes, and, when over a relatively long period of service the disc or ring wears thin, a new wearing disc is readily installed. It will be perceived that a clearance 17 is provided in the impeller chamber, to make accommodation for variation in thickness between the worn ring and the new.

For manifest reasons it is desirable that the pump shall not leak, and above all it is important that the abrasive-including liquid being pumped shall not enter the bearings for the impeller shaft. With this in mind, it is to be noted that I arrange the entire bearing structure for the shaft on the inlet or suction side of the impeller chamber, and that I seal the chamber 4 and entirely enclose the end of the shaft 5 on the pressure side of the impeller, by means of a cover plate 4a.

The bearing of this invention consists in an outer housing 1, in this case a cylindrical housing formed integrally with the body of the pump, and extending outward from the inlet passage 7 of the pump, on the axis of the impeller 6. At its inner end the housing 1 includes an end wall 1a, comprising a portion of the wall of the inlet passage 7 of the pump, and through this end wall 1a the shaft 5 extends with loose fit, as distinguished from a snug bearing engagement which, being a metal to metal engagement, would tend to scour and produce wear on the shaft. Within the housing 1 the bearing structure for the shaft is organized, and, as indicated fragmentarily at 5a, the shaft extends from the outer end of the housing for connection to a motor or other shaft-rotating means.

Turning to Fig. II, it will be perceived that within the housing 1, I provide two bearings for the shaft, indicated in general as bearings A and B. Between the bearing A and the end wall 1a of the housing 1, I provide means for sealing the structure within the housing from the inlet or suction passage 7 of the pump. Such means comprise a hard fibre disc 2 (as distinguished from the usual packing gland) through which the shaft 5 extends, as indicated at 2a. The disc 2 is tightly secured against the end wall 1a of the housing, by means of a sleeve 3 secured endwise against the periphery of the disc; so it will be perceived that the only possible avenue through which fluid may enter or leave the bearing structure within the housing 1 is between the body of the disc and the surface of the shaft. As will presently appear means are provided for closing such avenue to the flow of fluid.

The bearing A consists in a bearing member 9, including a head portion 9a and a sleeve portion 9b extending from such head portion. The bearing member 9 rotates in unison with the shaft 5 and performs a twofold function: first, it provides bearing support for the shaft in the interval between the bearing B and the pump impeller 6, and in such organization is effective to prevent "whip" in the shaft while the pump is in operation; and second, it bears axially against the hard fibrous body of the sealing disc 2, and prevents the disc from distorting and swelling (as fibrous material tends to do when subjected to moisture), and cooperates with the disc in sealing the bearing structure within the housing 1. As shown in Fig. II, the bearing member in this case engages the shaft 5 at 9e, and the engagement is such as to permit the bearing to slide axially upon the shaft. At a point spaced longitudinally from the region of bearing 9e, a collar 10 is by a pair of diametrically opposed screws 11 secured to the shaft 5; the wall of the sleeve portion 9b of the bearing member is spaced from the shaft, providing within the bearing member a recess 9d, in which a compressed helical spring 13 is organized; at its open end the sleeve portion 9b bears with sliding engagement upon the collar 10; and the body of the sleeve portion is slotted, as shown at 9c, to embrace the radially extending shanks of the screws 11. The spring 13 is effective between the fixed collar 10 and the base of the recess 9d, and serves to maintain the head of the bearing member in pressure engagement with the fibre disc 2. Thus, it will be understood that the screws 11, as engaged in the slots 9c, comprise a driving connection between the shaft 5 and the floating bearing member 9, and, by virtue of such connection, the bearing member 9 and spring 13 rotate in unison with the shaft. Within the limits of the slots 9c, the bearing member may shift axially of the shaft, without interrupting the driving connection.

The head 9a of the rotating bearing member is borne by and rotates against the inner surface of the sleeve 3.

As already mentioned, the only possible way for the liquid being pumped to enter the bearing structure is between the surface of the shaft 5 and the sealing disc 2. The snug pressure engagement of the bearing member against the disc 2 prevents any liquid that may seep or flow between the shaft and the disc from working its way between the engaged surfaces of such bearing member and disc into bearing structure. Within the recess 9d, I provide means for preventing infiltration of liquid between the surface of the shaft and the body of the bearing member. Such means comprise a conical collar 14 of rubber, disposed between the base of the recess and the spring 13; inasmuch as there is no relative rotation between the bearing member and the shaft, this elastic collar may be, and indeed is, compressed (by the spring) in snug liquid-tight engagement with the shaft, thus providing an excellent seal against the undesired infiltration of liquid. This snug engagement of the collar 14 with the shaft 5 and the engagement of the bearing member 9 with the face of disc 2 close all avenues through which liquid may enter the bearing structure. Thus, if liquid should filter in between the shaft 5 and the disc 2, it can go no further. Of course, when the pump is in operation, the rotating impeller produces a condition of subatmospheric pressure in the passage 7, and there is little or no tendency for liquid to enter the bearing. The tendency for liquid to enter the bearing from the passage 7 exists only when the pump is idle. Nevertheless, it is a thing which should be prevented. During normal operation of the pump the tendency is for lubricant to be sucked from the bearing housing into the inlet passage 7, and it will be understood that the structural features which I have described, as of value in excluding liquid from the bearing (while the pump is idle), are equally effective in preventing the escape of lubricant from the bearing.

It will be perceived that the only wear between the bearing parts thus far described occurs at three points: (1) between the stationary disc 2 and the rotating bearing member 9, (2) between the disc and the shaft, if indeed the disc snugly engages the shaft, and (3) between such bearing member and the cylindrical sleeve 3 within which the bearing member 9 rotates. In providing for facility and economy in the matter of replacements, the sleeve 3 is made in two sections—it is parted at 16, and only the relatively short portion immediately engaged by the rotating bearing 9 is replaced as the need arises. (Conveniently, two cork gaskets 18 are arranged between the assembled sleeve sections, to seal the joint 16.) Additionally, I embody within the face of the bearing member 9 a hardened steel wearing plate 15, so that, as between the rotating bearing 9 and fibre disc 2, all wear will be absorbed by the relatively inexpensive and readily replaceable disc.

It is further noteworthy of the structure described that the spring-backed bearing member automatically compensates for wear. That is to say, as in service the sealing disc 2 wears under the influence of the rotating bearing 9, the spring 13 progressively advances the bearing axially of the shaft, and maintains the desired pressure engagement of the bearing member with the sealing disc.

Within the housing 1 is an inner frame or housing 19, providing for the bearing B a chamber C which is aligned with and sealed from the chamber D in which the bearing A is enclosed. The inner end of the chamber C is closed by an end wall portion 19a, formed integrally with the body of the inner housing, and the outer end of the chamber is closed by means of a cover member 20, secured to the housing 19, by means of screws 21. A slight clearance is provided between the surface of the shaft 5 and both the wall portion 19a and the cover member 20, so that at these points, as elsewhere in my structure, there is no such frictional engagement of metal with the shaft as will tend to produce wear and leakage. At each end of the chamber C, within which bearing B is housed, I mount on the shaft an oil-sealing device 22 of well-known construction—including a leather gasket that snugly engages the shaft and provides the desired seal, without producing wear on the surface of the shaft.

The bearing B within the inner housing 19 is, advantageously, an anti-friction bearing, secured in fixed axial position on the shaft 5, whereby, by axially adjusting the housing 19 within the housing 1, the shaft 5 may be axially shifted within the bearing 9 and housing 1, and the position of the impeller 6 regulated with respect to the wearing ring 21. More specifically, the bearing B consists in two anti-friction bearings of known sort, comprising each an inner sleeve 23, mounted snugly upon and adapted to rotate with the shaft 5, and a complementary outer sleeve 24 borne by and secured against the cylindrical wall of housing 19. And between the two sleeves 23, 24 of each bearing the usual races of balls or rollers 25 are arranged to function in known way. The two anti-friction bearings are spaced apart axially of the shaft 5, and between the outer sleeves 24 thereof a spacing sleeve 26 is mounted in snug engagement with the cylindrical wall of the housing 19, while between the inner sleeves 23 of the bearings a spacing collar or sleeve 27 is secured to the shaft, by means of a screw 28. And as shown in Fig. II, the wall portion 19a and the closure member 20 prevent axial displacement of the bearings relatively to the spacing sleeves 26 and 27. By virtue of such structure, the desired bearing is provided for the shaft, and the shaft, while being freely rotatable, is secured in fixed axial position with respect to the housing 19. And manifestly the bearing assembly B is adapted to sustain the axial thrust imposed on the shaft by the impeller in rotation, it being understood that the shaft is so adjusted that the wearing ring 21 will assume little, if any, of such thrust.

Turning to the matter of adjustment, it will be noted that the inner housing 19 includes a radial flange 19b that in the assembled structure lies outward of and in parallelism with flanges 3b and 1b that are integral with the sleeve 3 and housing 1, respectively. Two set-screws 29 are secured in threaded engagement with the flange 19b of the inner housing 19, at diametrically opposite points in the flange, one of the screws 29 appearing in Fig. I and the other in Fig. II. These screws project through the flange 19b and bear at their ends against the outer face of the flange 3b of the sleeve 3. Screws 30 extend through the flanges 19b and 3b into threaded engagement with the flange 1b of the housing 1, and, manifestly, the tightening of these screws serves rigidly to secure the sleeve 3 and inner housing 19 in assembly with the housing 1. That is, the heads of the screws 30 bear upon the outer face of the flange 19b, and, as the screws are tightened, the housing 19 (together with the shaft 5 which is secured in fixed axial position with respect to the housing 19) is forced in right-to-left direction, as viewed in Fig. II; the screws 29 carried by the flange 19b, in bearing against the flange 3b, transmit the thrust of the tightened screws 30 to the sleeve 3, so that the sleeve 3 and housing 19 move inward together, until the inner end of the sleeve comes to abutment with and compresses the periphery of the sealing disc 2 against the end wall portion 1a of the outer housing 1. Thus, the sealing disc 2 is tightly secured and sealed against the wall portion 1a by the force exerted by the tightened screws 30. By adjusting screws 29 in the flange 19b, the axial position of the housing 19 with respect to the sleeve 3 and housing 1 may, manifestly, be regulated, so that the axial position of the shaft 5 (which position of the shaft is determined by the position of the inner housing 19) may be adjusted from time to time to maintain the desired relation between the impeller 6 and the wearing ring 21. And, as already mentioned, this axial adjustment of the shaft 5 does not interrupt the desired cooperation of the rotating bearing member 9 with the sealing disc 2. As the shaft is adjusted, either inward or outward, the spring expands or yields in such manner that the bearing member 9 remains in illustrated position in chamber D, and in engagement with the screws 11 for rotation in common with the adjusted shaft.

Lubrication of the bearing remains for consideration. Means are provided for supplying lubricant to each of the bearings A and B. A grease-cup 42a is mounted on the outer housing 1, and in known way is adapted to supply lubricant to the bearing B in chamber C. Communication between the outlet of the grease-cup and the bearing chamber is afforded by a passage 41, formed by aligned orifices in the walls of members 1, 3, 19, and 26, and it may be remarked that the range of the above-mentioned adjustment of the several parts of the structure is not so great as to move the orifices entirely out of registry with one another—the passage 41 is never blanked.

A lubricant fitting 42 controls an inlet to the chamber D, and by means of a lubricant gun or pump of known sort the chamber D is charged with medium weight lubricating oil to a pressure of ten pounds. A pressure gauge 43 is arranged, as shown, to indicate the pressure during charging. The gauge 43 is adapted to indicate negative (subatmospheric) pressure as well as positive (superatmospheric) pressure, and it will be understood that the gauge provides, when the pump is in operation, means for ascertaining whether or no liquid will leak from the inlet passage 7 of the pump, when the pump is idle. Specifically, when the pump is in operation the indicated pressure of the lubricant in chamber D approaches zero reading on the gauge, zero reading of the gauge indicating a condition of normal atmospheric pressure within the bearing chamber. So long as the gauge index points to zero, or any value above zero, all is well. If, however, the index points to a value below zero, it indicates a condition of subatmospheric pressure in the bearing chamber D, and this means only one thing; namely, that a leak has developed between the chamber D and the inlet or suction passage 7 of the pump, and that as soon as operation of the pump is arrested abrasive-carrying liquid will enter the bearing structure. Thus, the gauge affords a positive indication of the development of a dangerous condition, and the attendant has visual notice that repair is required.

When the pump has been idle for a considerable interval of time, the attendant may remove a stopper 44 from the bottom of the housing 1 and drain off a quantity of liquid from the chamber D. If water appears with the lubricant thus drained off, the attendant will know that leakage exists between the bearing structure and the pump inlet, and that he should dismantle the bearing, clean and repair it, before starting normal operation. Manifestly, it is merely necessary to remove the two screws 30, and disengage the impeller from the shaft, to permit a complete dismantling of the bearing structure from the housing 1.

I have found in the operation of pumps employing my bearing a tendency for the lubricant in chamber D to work its way between the engaged surfaces of the floating bearing member 9 and the sleeve 3, and to collect in the region (40) between the disc 2 and head 9a of the bearing member. Of course, it is desirable that an adequate quantity of lubricant shall be supplied to the engaged surfaces of the bearing member 9 and disc 2, but it is unnecessary and objectionable to allow a substantial body of oil to collect in region 40 under a pressure above the pressure existing in the inlet passage 7 of the pump, since such a condition augments the tendency for lubricant to escape into such inlet passage while the pump is in operation. In order to correct this condition, I advantageously provide a helical groove 9e in the cylindrical surface of the head portion 9a of the bearing member. In this case the direction of rotation of the shaft 5 is clockwise, as considered from the right of Fig. II, and the groove 9e extends in the helical direction of a right-hand screw. Thus, when the pump is in operation, the helical groove (in cooperation with the inner surface of sleeve 3) opposes the flow of oil from chamber D into region 40, and, indeed, if the region 40 becomes filled with oil, the groove in the rotating bearing member is effective to establish a counterflow of oil from region 40 to chamber D.

Within the terms and intent of the following claims, it is contemplated that various modifications may be made without departing from the invention.

I claim as my invention:

1. A bearing structure for a rotary shaft, said bearing structure including an outer housing providing a bearing chamber, and an inner housing providing a second bearing chamber in axial alignment with the first chamber, and said shaft extending through said chambers; said first chamber including a sealing disc through which said shaft extends, a bearing member, means for securing said bearing member to rotate in unison with said shaft while permitting movement of such bearing member axially of the shaft, and a spring arranged to hold said rotating bearing member in pressure engagement with said sealing disc; a bearing arranged in the chamber in said inner housing, means for securing said bearing in fixed position axially of said shaft and inner housing, said inner housing being axially adjustable within said outer housing, whereby said shaft may be axially shifted relatively to said outer housing without interrupting the pressure engagement of said first bearing member with said sealing disc.

2. A bearing structure for a rotary shaft, said bearing structure including an outer housing providing a bearing chamber, and an inner housing providing a second bearing chamber in axial alignment with the first chamber, and said shaft extending through said chambers; said first chamber including a sealing disc through which said shaft extends, a bearing member, means for securing said bearing member to rotate in unison with said shaft while permitting movement of such bearing member axially of the shaft, and a spring arranged to hold said rotating bearing member in pressure engagement with said sealing disc; two anti-friction bearings arranged within said inner housing and spaced apart axially of said shaft, each of said last-mentioned bearings including an inner sleeve portion borne by the shaft and an outer sleeve portion borne by the inner housing, with a race of ball-bearings between the sleeve portions, means secured to said shaft between said inner sleeve portions of said bearings, and means supported by said housing between the outer sleeve portions of said bearings, whereby adjustment of said inner housing relatively to said outer housing operates to shift said shaft relatively to the first-specified bearing member without interrupting said pressure engagement of such bearing member with said sealing disc.

3. A bearing structure for a rotary shaft, said bearing structure including an outer housing providing a bearing chamber, and an inner housing providing a second bearing chamber in axial alignment with the first chamber, and said shaft extending through said chambers; said first chamber including a sealing disc through which said shaft extends, said outer housing including an end wall, means for securing said sealing disc in stationary position against said end wall, a bearing member, means for securing said bearing member to rotate in unison with said shaft while permitting movement of such bearing member axially of the shaft, and a spring arranged to hold said rotating bearing member in pressure engagement with said sealing disc; a bearing arranged in the chamber in said inner housing, means for securing said bearing in fixed position axially of said shaft and inner housing, said inner housing being axially adjustable within said outer housing, whereby said shaft may be axially shifted relatively to said outer housing without interrupting the pressure engagement of said first bearing member with said sealing disc.

4. A bearing structure for the shaft of a rotary pump, said structure including an outer bearing housing extending from the inlet of said pump and providing a bearing chamber, said housing carrying an end wall through which said shaft extends, an inner bearing housing providing a second bearing chamber sealed from the first, a bearing for the shaft in each of said chambers, a sealing disc mounted on the shaft between the end wall of the outer housing and the bearing in said chamber therein, means for introducing lubricant into each of said bearing chambers, means for indicating superatmospheric pressure of lubricant charged into said first chamber, said means being operable during pump operation for indicating a condition of subatmospheric pressure in such chamber, substantially as described.

5. The structure of claim 4, in which a sleeve is arranged within said outer bearing housing, and is secured endwise against said sealing disc, to lock such disc against rotation.

6. The structure of claim 1, in which a sleeve is arranged within said outer housing, and is secured endwise against said sealing disc, to lock such disc against rotation.

7. The structure of claim 1, in which a sleeve is arranged within said outer housing, and is secured endwise against said sealing disc, to lock such disc against rotation, said inner housing being axially adjustable within said sleeve.

8. The structure of claim 1, in which a multiple part sleeve is arranged within said housing, and is secured endwise against said sealing disc, to lock such disc against rotation.

9. A bearing structure for a rotary shaft, said bearing structure including a housing, two bearings for said shaft within said housing, one of said bearings being secured in fixed position axially of said shaft, means for securing the other of said bearings for rotation in unison with said shaft while permitting axial movement of the shaft within such bearing and relatively to said housing, and a spring organized with the last-mentioned bearing and rotatable with such bearing in unison with said shaft, said rotating spring exerting a force tending to shift such bearing on the shaft relatively to the first bearing.

10. A bearing structure for a rotary shaft, said bearing structure including a housing, two bearings for said shaft within said housing, one of said bearings being secured in fixed position axially of said shaft, means for securing the other of said bearings for rotation in unison with said shaft while permitting axial movement of the shaft within such bearing and relatively to said housing and a spring organized with the last-mentioned bearing and rotatable with such bearing in unison with said shaft, said rotating spring exerting a force tending to shift such bearing on the shaft relatively to the first bearing, together with means for adjusting the first bearing in said housing and shifting said shaft within the spring-urged second bearing.

11. A bearing structure for a rotary shaft, said bearing structure including a housing provided with a wall portion through which said shaft extends, a rotary bearing member mounted on said shaft and secured to rotate with the shaft, a sealing disc through which said shaft extends, means for securing said sealing disc against rotation, and means urging said rotary bearing member axially of said shaft into pressure engagement with said non-rotating disc, and a sealing device engaging said shaft and rotatable in unison with said shaft and said bearing member.

12. A bearing structure for a rotary shaft, said bearing structure including a housing provided with a wall portion through which said shaft extends, a rotary bearing member mounted on said shaft and secured to rotate with the shaft, a sealing disc arranged between said wall portion and said bearing member, said shaft extending through said sealing disc, and means urging said rotary bearing member axially of said shaft and into pressure engagement with said sealing disc, a sealing device engaging said shaft and rotatable in unison with said shaft and bearing member together with means for axially adjusting said shaft while said bearing member remains secure for rotation in common with the shaft and in said engagement with said sealing disc.

13. A bearing structure for a rotary shaft, said bearing structure including a housing provided with a wall portion through which said shaft extends, a rotary bearing member mounted on said shaft and secured to rotate with the shaft, a sealing disc through which said shaft extends, means for securing said sealing disc against rotation, and means urging said rotating bearing member axially of said shaft into pressure engagement with said non-rotating disc, together with means for axially adjusting said shaft relatively to said non-rotating sealing disc and said bearing member without destroying said pressure engagement of the bearing member with the sealing disc.

14. A rotary bearing member for a shaft carrying a collar, said bearing member comprising a head portion borne by said shaft and a sleeve portion extending from said head portion concentrically of said shaft and engaging said collar at a point spaced longitudinally of the shaft from the point at which said head portion is borne by the shaft, and a spring arranged between said collar and said bearing member and tending to shift said bearing member relatively to said collar.

15. A rotary bearing member for a shaft carrying a collar, said bearing member comprising a portion borne by the shaft at a point spaced longitudinally of the shaft from said collar, and a portion engaging said collar, means for securing the bearing member for rotation in unison with said shaft while permitting movement of the bearing member axially of the shaft, and a spring arranged within said bearing member and acting between said collar and the bearing member and tending to shift the bearing member axially of the shaft.

16. A rotary bearing member for a shaft carrying a collar, said bearing member comprising a portion borne by the shaft at a point spaced longitudinally of the shaft from said collar, and a portion engaging said collar, means for securing the bearing member for rotation in unison with said shaft while permitting movement of the bearing member axially of the shaft, and a spring arranged within said bearing member and acting between said collar and the bearing member and tending to shift the bearing member axially of the shaft, together with a sealing member engaging said shaft within said bearing member, said sealing member being rotatable in unison with said shaft and bearing member and being subject to the force of said spring.

17. A bearing structure for a rotary shaft, said bearing structure including a stationary housing wall portion through which said shaft extends, a rotary bearing member mounted on said shaft and secured to rotate with the shaft, a sealing disc through which said shaft extends, and means urging said rotary bearing member axially of the shaft into pressure engagement with said disc, and a sealing device engaging said shaft and rotatable in unison with said shaft and said bearing member.

DANIEL MURPHY.